(12) United States Patent
Leung et al.

(10) Patent No.: US 6,205,339 B1
(45) Date of Patent: Mar. 20, 2001

(54) METHOD AND APPARATUS FOR ESTABLISHING TDD/TTY SERVICE OVER VOCODED CHANNELS

(75) Inventors: Nikolai K. N. Leung, Arlington, VA (US); Andrew DeJaco; Johnny John, both of San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/114,344

(22) Filed: Jul. 13, 1998

(51) Int. Cl.$^7$ ............................. H04B 1/38; H04M 1/00
(52) U.S. Cl. ........................... 455/553; 455/557; 379/52
(58) Field of Search .................... 455/557, 566, 455/552, 553, 556; 379/52, 93.17, 93.18; 340/825.19

(56) References Cited

U.S. PATENT DOCUMENTS

| | | | |
|---|---|---|---|
| 5,200,991 | 4/1993 | Motoyanagi | 379/61 |
| 5,272,747 | 12/1993 | Meads | 379/59 |
| 5,351,288 | * 9/1994 | Engelke et al. | 379/52 |
| 5,883,927 | * 3/1999 | Madsen et al. | 455/63 |
| 5,974,116 | * 10/1999 | Engelke et al. | 379/52 |

FOREIGN PATENT DOCUMENTS

| | | |
|---|---|---|
| 0690600 | 1/1996 | (EP) . |
| 2307831 | 6/1997 | (GB) . |
| 9511559 | 4/1995 | (WO) . |
| 9535002 | 12/1995 | (WO) . |
| 9627975 | 9/1996 | (WO) . |

OTHER PUBLICATIONS

Lockwood, Judith "Opinion: Who's Not Hearing?" Wireless Week pp. 1–2 (Nov. 1998).
Ultratec "Ultratec Goes Cellular" pp. 1–2 (1998).

* cited by examiner

*Primary Examiner*—Nguyen Vo
(74) *Attorney, Agent, or Firm*—Philip Wadsworth; Kent D. Baker; Kyong H. Macek

(57) ABSTRACT

A method and apparatus to facilitate service negotiation by a digital telecommunications system that allows a low activity communication to be transmitted by the system over vocoded channels. In one embodiment, once the telecommunication system is noticed that a low activity signal needs to be transmitted, each telecommunication system vocoder involved in the transmission automatically locks into full rate, and where applicable, adjusts the transmission power to reduce frame error rate. Further, the telecommunications system may include any number of wireless links. The invention includes a noticing apparatus coupled to a sensor that receives a low activity communication device attachment and notices the digital telecommunications system that a low activity communication is being initiated or discontinued.

21 Claims, 4 Drawing Sheets

METHOD AND APPARATUS FOR ESTABLISHING TDD/TTY SERVICE OVER VOCODED CHANNELS

BACKGROUND OF THE INVENTION

1. Field of the Invention

Generally, the present invention relates to the field of telecommunications devices for the deaf (TDDs). More particularly, the invention relates to service negotiation within a telecommunication system that allows a low activity code based signal to be transmitted by the system. The system may include wireless links.

2. Description of the Related Art

Many deaf or hearing-impaired people use communication terminals specifically constructed and designed to enable them to communicate over standard telephone lines. Such devices, referred to as telecommunication devices for the deaf (TDDs) or Text Telephone Yokes (TTYs), are collectively referred to as TTDs in this application. Typically, TTDs include a keyboard and a display connected to a telephone via a modem (modulator/demodulator). The modem is built into the TDD and is either directly connected to a telephone line or coupled by an acoustic coupler to a normal telephone handset. TDDs are capable of transmitting information over telephone lines by means of coded tones to other TDDs connected at opposite ends of the telephone line through another modem. These tones are referred to as low activity communications because the frequency and amplitude envelopes remain relatively constant.

The code and protocol that is in widespread conventional use for TDD communications is an idiosyncratic one. The code set, known as Baudot, and the communication protocol (TDD protocol) evolved historically at a time when many telecommunication devices for the deaf were based on mechanical or electromechanical devices rather than electronic devices. Accordingly, the TDD protocol was constructed for a set of constraints that no longer are relevant to present day devices. Those constraints work to create a code protocol and a telecommunication network of users and devices operating under that protocol, that is somewhat antiquated.

Traditionally, TDD communications are conducted at 50 Baud (45.5 Baud in some countries), representing a transfer of 6 characters per sec. Other protocols now available for TDD communications incorporate higher Baud rates, such as the ASCII (American Standard Code Information Interchange) and enhanced Baudot protocols. Regardless, a normal TDD communication character set consists of characters that are 5 bits long. These characters are analogous to a letter in an alphabet where each letter represents a word or idea. A character is grouped with some information bits prior to transfer where each group of bits to be transferred has a duration or unit interval equal to 20 milliseconds. For example, under conventional TDD protocol, a group of bits to be transferred comprises 8 bits: a start bit (one source or zero bit), five bits representing the character, and at least one and ½ bits marking the stop point of the transfer group.

Compared to modem telecommunication systems, TDD transmissions occur at a snail's pace. A bigger problem is that TDD signals are substantially constant. These slow paced, monotone signals can create havoc in digital telecommunication systems that transmit higher activity signals at very high rates, especially telecommunication systems that include wireless links. One example of such a telecommunication system is a code division multiple access (CDMA) system having a large number of wireless subscriber units. Each subscriber unit has a transceiver and communicates within the system through satellite repeaters or terrestrial stations referred to as cells. Each cell includes a physical plant called a base station. A cell covers a limited geographic area and routes calls carried over subscriber units to and from the telecommunication network via a mobile switching center. When a subscriber moves into the geographic area of a new cell, the routing of that subscriber's call may be eventually made through the new cell by a process called a "handoff."

A subscriber unit, generically referred to as a cell phone, transmits a signal that is received by a base station. The signal is relayed to a mobile switching center that routes the signal to a public switched telephone network (PSTN) including telephone lines or other subscriber units. Similarly, a signal may be transmitted from the PSTN to a subscriber unit via a base station and a mobile switching center.

The interface between the subscriber unit and the base station is referred to as the air interface. The telecommunications industry association (TIA) has provided a standard for CDMA call processing on the air interface entitled "IS-95 Mobile Station Base Station Compatibility Standard for Dual Mode Wideband Spread Spectrum Cellular System." Addendum to IS-95 are provided as Telecommunications Service Bulletins (TSB). The standard IS95+TSB74 includes provisions for service negotiation on the air interface and is incorporated herein by reference.

Service negotiation is critical to successfully transmit any communication, especially a low activity TDD communication, over a digital telecommunication system. One problem with modern systems, including the one described above, is that a vocoder—a device used in the system to encode a voice or TDD analog signal into a digital signal, and to decode a digital signal into a voice or TDD analog signal—has difficulty in handling the substantially monotone signal and slow speed dictated by the TDD protocol. Further, no method or device currently exists for noticing a telecommunication system that a TTD communication is being received and to make adjustments as required to successfully transmit a low activity signal. In current systems, a low activity communication signal such as a TDD communication would probably be treated by the vocoder as background noise or signal interference and be disregarded.

What is needed is a method and apparatus that can be easily integrated into existing digital communication systems, that can sense when a low activity communication, such as a TDD communication, is received, and that can notice the system to automatically negotiate the service to be used by the communication system during transmission of the low activity communication.

The method and device should be compatible with CDMA modulation systems and the techniques used in telecommunication systems servicing large numbers of system users. A more robust discussion of CDMA systems and techniques in this type of multiple access communication systems may be found in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein. Further, the method and device should also be compatible with other modulation systems and techniques used in other communication systems, such as time division multiple access (TDMA), frequency division multiple access (FDMA), and amplitude modulation (AM) schemes.

SUMMARY OF THE INVENTION

Broadly, the present invention involves service determination in a telecommunication system that allows a low activity communication to be transmitted by a digital telecommunication system. More particularly, the invention concerns a method and apparatus that locks any voice encoder and decoder (vocoder) involved in the low activity communication transmission into a full rate and notices the telecommunication system incorporating the vocoders to minimize the transmission's frame error rate (FER) by adjusting the system's transmit parameters as necessary.

One embodiment of the invention provides a method to establish the service used to transmit a TDD communication within a telecommunication system. Although a TDD communication is discussed throughout this application, it should be understood that any slow or low activity communication may be transmitted using this invention. In this embodiment, after a TDD communication signal is received, each vocoder involved in processing the TDD signal is locked into a full rate. Full rate, discussed more fully below, refers to representing a transmitted signal using a fixed number of unique bits. The TDD signal is encoded to create a digital signal and then transmitted by the telecommunication system. In one embodiment, once the telecommunication system is noticed that a TDD signal is being received, each vocoder is automatically locked into full rate, and where applicable, the system attempts to decrease errors in the air link such as by increasing transmission power to reduce the FER. Further, the telecommunication system may include any number of wireless links.

In another embodiment, the invention may be implemented to provide a noticing apparatus for use by a telecommunications system for transmitting TDD communications. The noticing apparatus may include a device port configured to receive a TDD attachment that allows a TDD keyboard and monitor to be communicatively coupled to the telecommunication system. The devise port may include an integral sensor that senses when a TDD device has been connected to the port and causes the telecommunication system to be noticed that a TDD communication may be received.

The invention provides its users with numerous advantages. One advantage is that a TDD message can be transmitted using a digital transmission medium having wireless links. Another advantage is that when a TDD device is connected to a digital telecommunication system, the device can be automatically "sensed" and the system can establish the necessary service to transmit the TDD signal. Yet another advantage is that a TDD device can be connected to a mobile device or subscriber's unit, such as a digital cellular telephone, connected to the telecommunications system by a wireless link. The invention also provides a number of other advantages and benefits that should become even more apparent after reviewing the following detailed descriptions of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF THE PREFERRED EMBODIMENTS

FIGS. 1 through 4 illustrate examples of various method and apparatus aspects of the present invention. For ease of explanation, but without any limitation intended, these examples are described in the context of a TDD communication device attached to a digital telecommunication system incorporating wireless links, one example of which is described below.

Hardware Components and Interconnections

Figure 1:
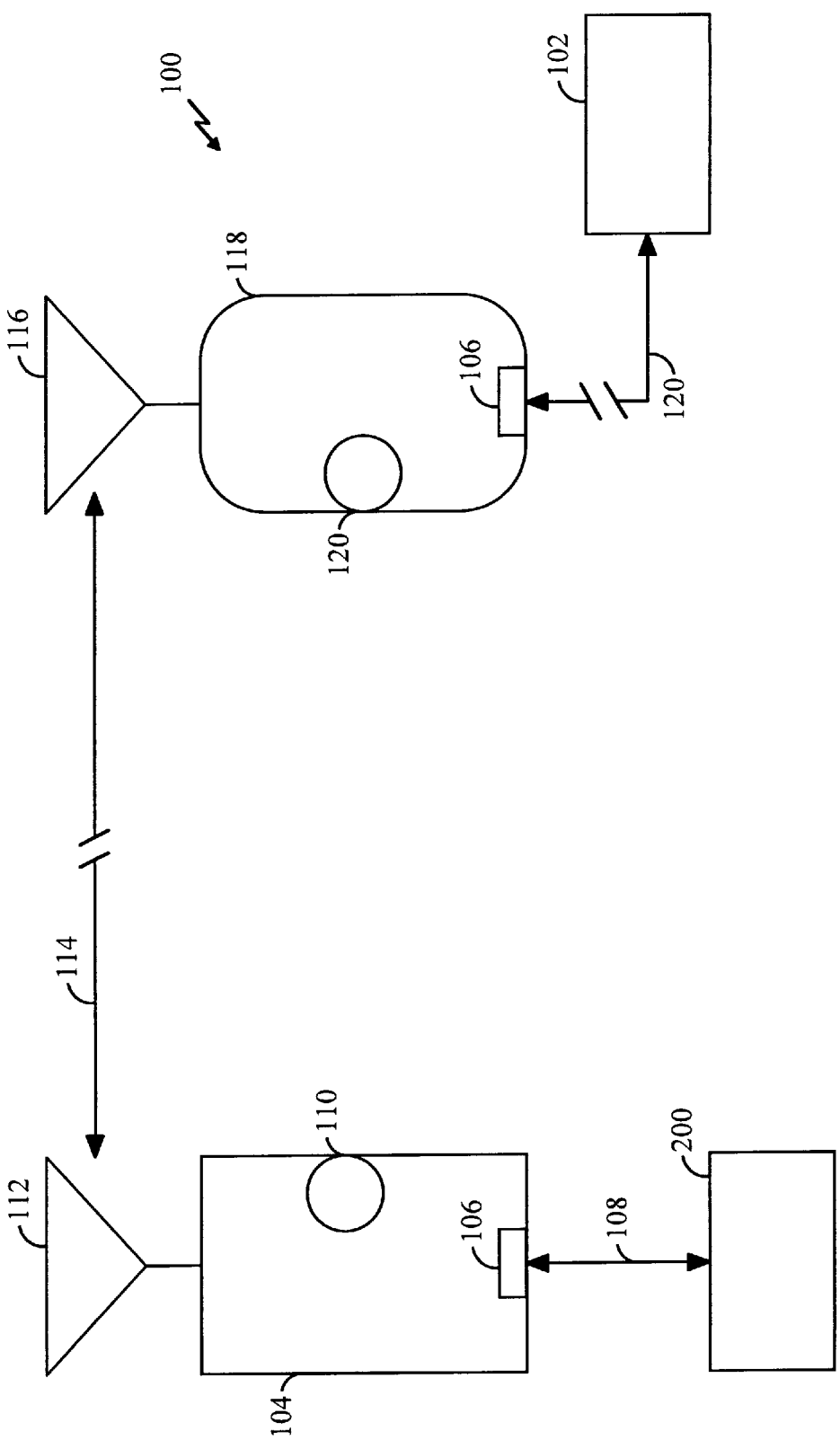
FIG. 1 is a block diagram of the hardware components and interconnections of a telecommunications system incorporating wireless links in accordance with one embodiment of the invention.

FIG. 1 illustrates one type of telecommunications system 100 including wireless links and a TDD communication device (TDD) 200 as used in the present invention. As shown in detail in FIG. 2, TTDs usually include a keyboard and a display that are connected to a telephone via a modem (modulator/demodulator). The modem is built into the TDD and is either directly connected to a telephone line or coupled by an acoustic coupler to a normal telephone handset. TDDs are capable of transmitting information over telephone lines by means of coded tones to other TDDs, such as TDD 102 shown in FIG. 1, connected at opposite ends of a telephone line through another modem.

Figure 3:
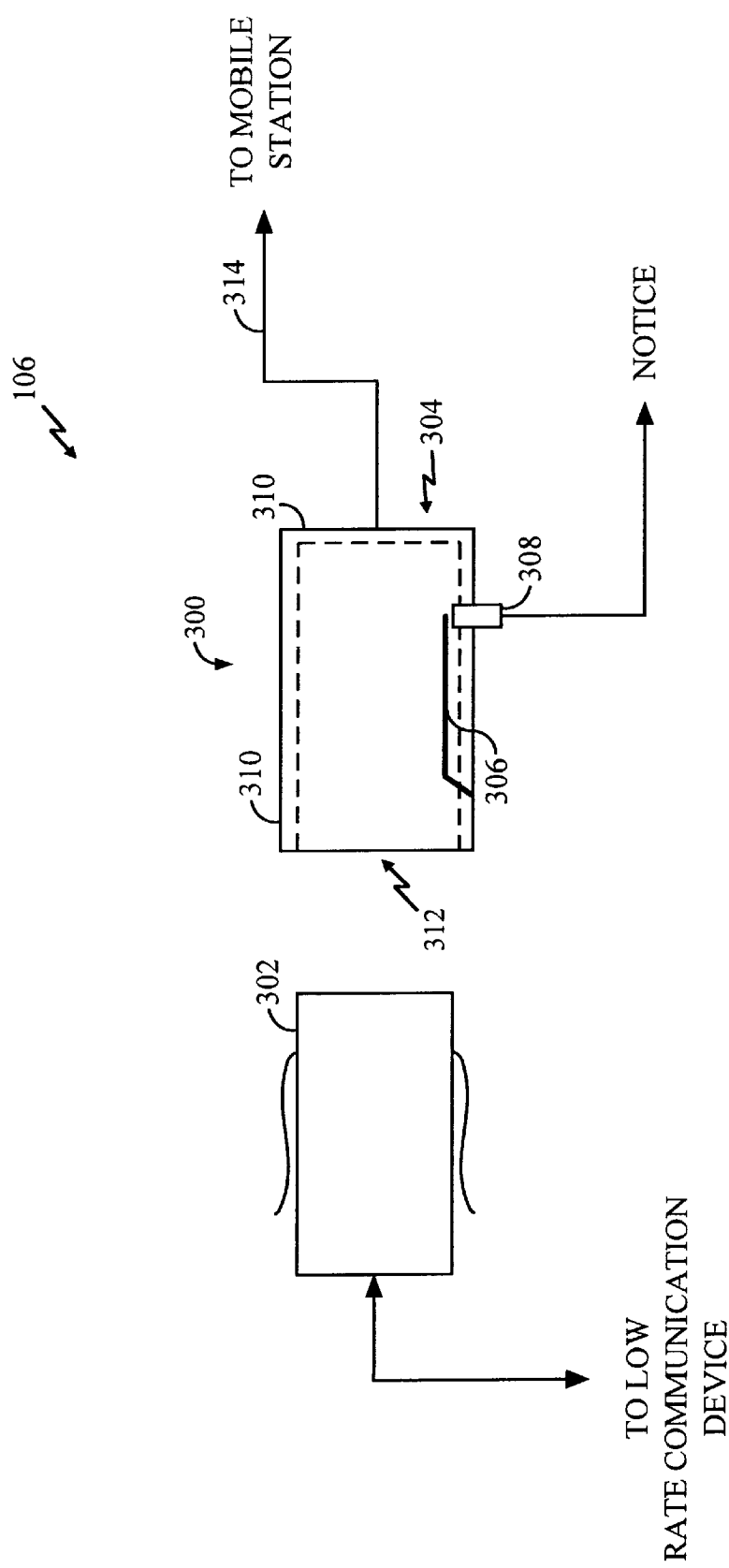
FIG. 3 shows a noticing apparatus and low activity device attachment in accordance with one embodiment of the invention.

In digital telecommunications systems using wireless links, the TDD 200 may be coupled to a subscriber unit 104 that is used in the telecommunications system 100 to transmit received signals. Exemplary embodiments of a mobile unit 104 are digital signal telephones, such as the Q-800 manufactured by QUALCOMM, Inc., and commonly referred to as cell phones. The subscribers unit 104 as shown in FIG. 1 includes a noticing apparatus 106 communicatively coupled to circuitry of the subscribers unit 104 and commonly known to those schooled in the art. A hardwire 108 may be used to connect the TDD 200 to the subscribers unit 104 via the noticing apparatus 106. In one embodiment, the noticing apparatus 106 includes a device port 300 as shown in FIG. 3.

The device port 300 may be configured to receive a low activity communication device attachment 302 such as a plug, connector, or receiver. These items are commonly used today for connecting telephone and computer equipment, and are readily available from electronics suppliers. The device port 300 interfaces with the attachment 302 to communicatively connect a low activity communication device (not shown) such as the TDD 200 to the subscriber unit 104 of the telecommunications system 100. The device port 300 allows information to be exchanged between a low activity communication device and the subscriber unit 104.

A sensor 304 may be included in the device port 300. The sensor 304 cooperates with the device port 300 to detect when a low activity communication device has been connected or disconnected to the subscriber unit 104, or when a low activity communication signal has been received or terminated. This detection causes vocoders used by the telecommunications system 100 to be noticed that a low activity communication will be received or has ended. If noticed of receipt, any vocoder used to transmit the low activity communication signal is locked into a full rate. In another embodiment, the vocoders are locked into full rate and the transmission power used to transmit the low activity signal is adjusted as needed to decrease the frame error rate (FER) and improve transmission quality. Usually, the transmission power is increased by the system in an attempt to achieve a desired FER. If notice is received that the low activity communication has ended, the vocoders are unlocked and resume their regular functions. This response by the vocoders is discussed in more detail below.

The sensor 304 may simply comprise a prong 306 and a contact 308. When the attachment 302 is inserted into the device port 300, the prong 306 is depressed and contacts contact 308. This contact may close a circuit thereby allowing the insertion of the attachment 302 to be detected. A variety of circuit designs for this type of sensing arrangement are known in the art and may be used. In another embodiment, the sensor 304 may comprise a light or laser beam with continuity detector, the beam being interrupted when the port device 302 is inserted and the interruption initiating the notice signal. In another embodiment, the sensor may comprise software and associated hardware, such as a processor, that detects when a low activity communication signal is received or terminated by the device port 300 and communicated to the subscriber unit 104. Regardless of the embodiment, the sensor 304 causes notice to be sent to the telecommunications system 100 that a low activity communication signal has been received for transmission, or if it has ended.

As shown if FIG. 3, the device port 300 may include walls 310 where the walls form an enclosure open at one end and define a hollow 312. Communication connectors (not shown) may be coupled to at least one wall 310 and extend into the hollow 312, where the connectors are configured to receive the low activity communication attachment 302 communicatively coupled to the low activity communication device 200. A communication link 314 of a variety known in the art couples the communication connectors to the telecommunications system, wherein the receipt of said low activity attachment 302 into said device port 300 allows a communicative signal from said low activity communication device to be received by said telecommunications system 100.

Returning to FIG. 1, after the low activity communication signal is received by the noticing apparatus 106, the signal is processed by the subscriber unit 104. Very basically, a signal for transmission is created that includes the information contained in the low activity signal. Because the telecommunications system 100 has been noticed that a low activity signal is being transmitted, the system adapts to assure a decipherable transmission occurs. For example, an analog signal received from the analog circuitry 228 shown in FIG. 2 normally would undergo signal or "voice" processing including digitizing the signal, setting a transmit power level to protect against signal fading during transmission, compressing the signal, and filtering. These functions may be performed by the circuitry (not shown) of the subscriber unit 104 that includes a vocoder. Depending upon the signal received, the vocoder dynamically determines and negotiates service within the telecommunications system 100 to provide successful transmission and decoding of the signal. This negotiation involves establishing the values for multiple parameters, such as the rate the vocoder should use, the transmission power, and compression technique. A fuller discussion concerning the processing of signals for transmission in telecommunication system may be found Electronic Industry Association standard TIA/EIA/IS-95-A entitled "Mobile Station-Based Station Compatibility Standard for Dual-Mode Wideband Spread Spectrum Cellular Systems, incorporated by reference herein, and other transmission standards well known in the art.

However, when a low activity signal is received, a vocoder may identify the signal as either noise, a pause, or a signal not intended to be transmitted. Simply, a vocoder doesn't know what service to use because it cannot identify the low activity signal received. By noticing the system 100 that a low activity signal is being sent, the vocoder will establish the service needed to assure the best possible transmission and decoding of the signal. In one embodiment, this service negotiation will result in the vocoders being locked into a full rate. Additionally, the transmission power level may be increased, or at least not reduced, thereby reducing the frame error rate that might otherwise make the transmitted signal undecipherable. This decrease in the FER may be caused by a closed-loop power control system included in the communication system that automatically increases the power to lower the FER.

After the low activity communication signal has been processed and the service determined, a digitized signal may be transmitted using an antenna 112 over a wireless link 114. The digitized signal is received by another antenna 116 at a remote location, such as a base station 118, and processed by base station circuitry (not shown) including a vocoder 120. Various based station circuitry arrangements for telecommunications systems are well known in the art, and a further understanding may be found in TIA/EIA/IS-95-A referenced above. By processing the signal after receipt, a low activity signal reflecting the information contained in the transmitted low activity signal may be delivered to the low activity device 102 via communication link 120. A second noticing apparatus 106 is shown coupled to the base station 118. This provides for a low activity signal to be sent from the low activity communication device 102 back to the TDD communication device 200.

Communication link 120 appears bifurcated to emphasize that the base station 118 may not be connected directly to the low activity device 102. The base station 118 is usually connected to a standard PSTN switching station commonly used by telephone companies for coordination of telephone calls and the low activity device 102 is connected to the PSTN. In another embodiment, a second mobile station (not shown) connected to the low activity communication device 102 may be linked to the base station 118. Further, the telecommunication system may include mobile switching stations as mentioned above.

Figure 2:
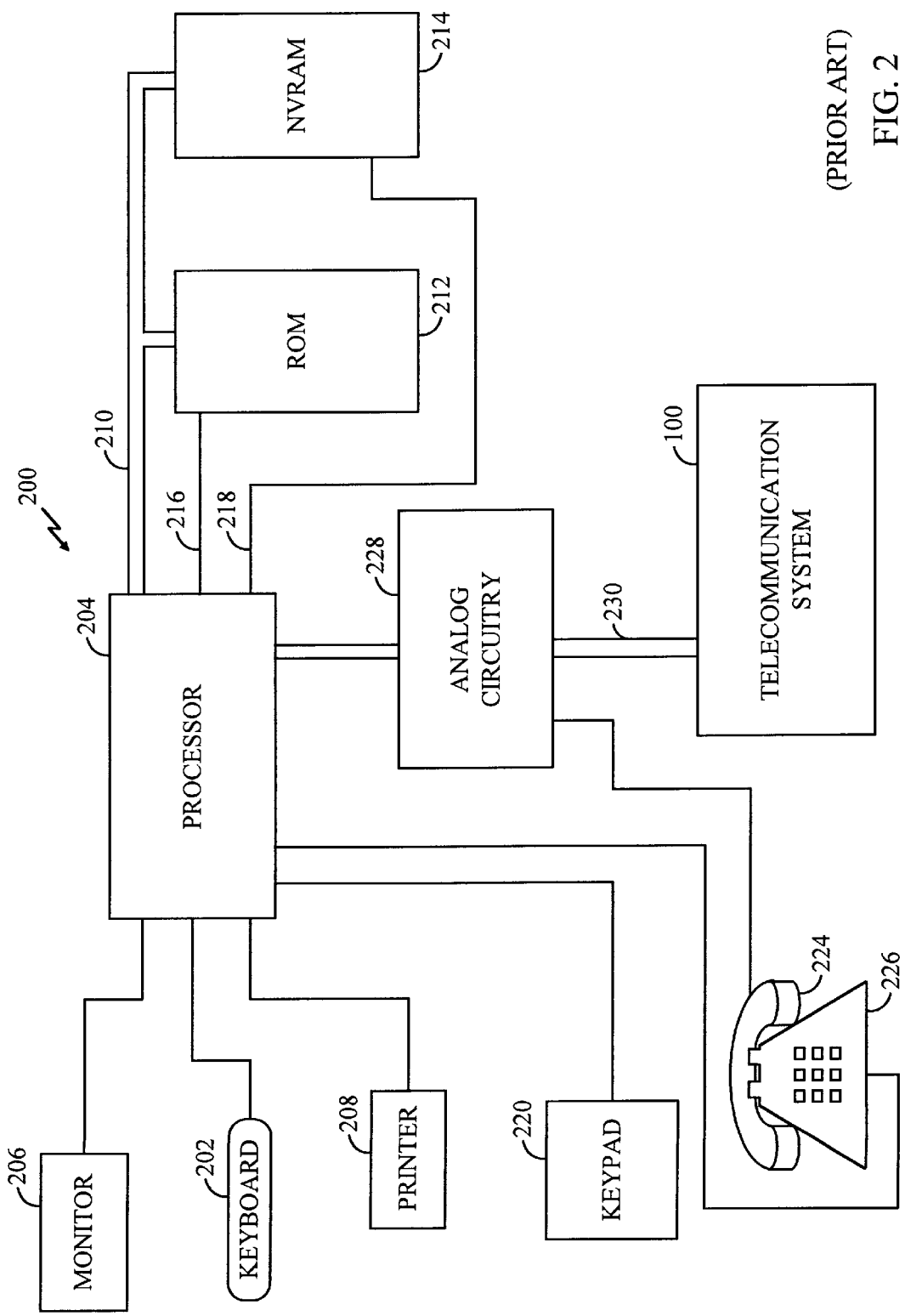
FIG. 2 illustrates a typical prior art TDD communication device used in accordance with one embodiment of the invention.

Shown in FIG. 2 is a schematic block diagram of the circuitry of a typical TDD device 200, either a standard or enhanced TDD, operating in accordance with the present invention. In the TDD device 200 of FIG. 2, a keyboard 202 is provided into which the user may input data characters. The output of the keyboard 202 is connected to a processor 204 that serves to control the circuit elements contained in FIG. 2. Characters that are received or transmitted by the processor 204 are also displayed on a display 206. Optionally, the same characters received or transmitted may be reproduced on a device such as printer 208. Some TDD devices may not have a printer, although it standard for TDDs to have a visual display of some kind so that a user can see the characters being typed and received. The keyboard 202 thus functions as an input source of data characters to the processor 204 while either or both the display 206 and the printer 208 serve as local destinations for the data stream characters.

The processor 204 may be connected by a suitable data and address bus that would typically be used for this type of application by one schooled in the art. In FIG. 2, the bus 210 connects a read only memory (ROM) 212 to a non-volatile random access memory (NVRAM) 214. Appropriate control lines 216 and 218 are connected from the processor 204 to the ROM 212 and the NVRAM 214 providing interactive control of these units. The ROM 212 is intended to permanently store the program that dictates the operation of the processor 204 as well as certain data used by the program. For example, special character strings for machine-to-machine communication and for synchronizing two TDDs in an enhanced operating mode may be stored. The NVRAM 214 is used as a buffer, a floating storage place for data coming into or out of the TDD device 100, and for storage of standard messages as entered by the user through the keyboard 202 and intended for rapid use. Other circuitry configurations may be used, such as combining the microprocessor 202 with the ROM 212 and the NVRAM 214 in a single integrated circuit.

Also connected to the processor 202 in FIG. 2 is a telephone keypad 220 that permits the entry of telephone numbers for dialing by the processor 204 through telecommunications system 100. A standard telephone handset 224 rests on a cradle 226 that incorporates a switch (not shown) indicating whether the handset 224 is in use and thus removed from the cradle 226.

The processor 204 is communicatively connected through analog circuitry 228 to the telecommunications system 100. This connection is shown as a hardwire connection 230, but may be any type of connection that can communicatively link the analog circuitry 228 with the telecommunications system 100. The analog circuitry 228 provides a connection between the handset and the processor 204 allowing both Baudot tones and dialing tones to be received by the telecommunications system 100. The analog circuitry 228 provides an interface of voice information to and from the handset 224. The analog circuitry 228 of the TDD device 200 is connected to the telecommunication system 100 using a connector such as the device discussed in relation to FIGS. 1 and 3.

Despite the specific foregoing descriptions, ordinarily skilled artisans having the benefit of this disclosure will recognize that the apparatus discussed above may be implemented in a telecommunications system of different construction without departing from the scope of the present invention. As a specific example, multiple subscriber unit 104 may be linked to the base station 118, or the low activity communication device 200 may be integrated with the subscriber unit 104.

Operation

Figure 4:
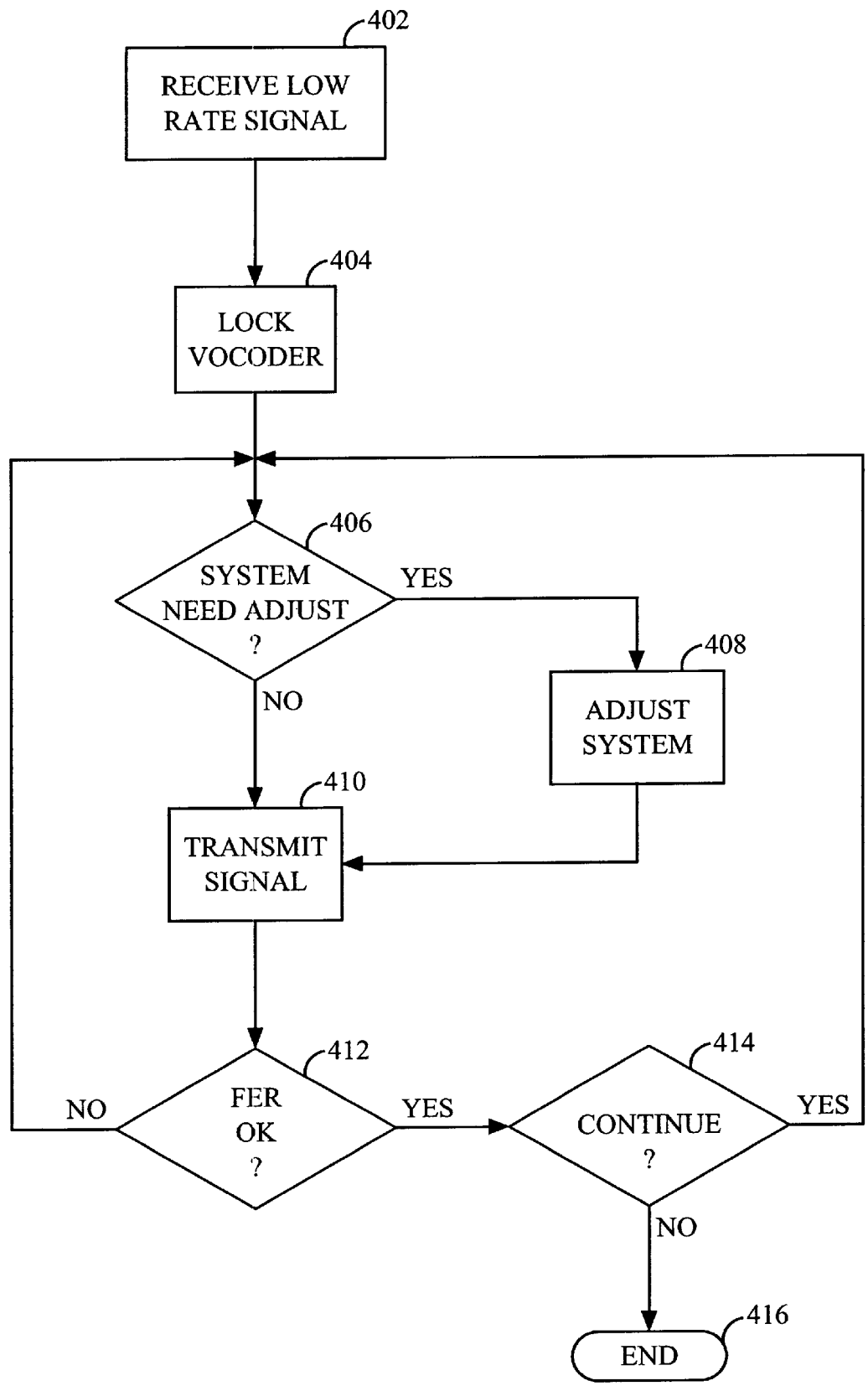
FIG. 4 is a block diagram of one method aspect in accordance with the invention.

Various aspects of the methods of the present invention were disclosed above. To further facilitate an understanding of the invention, FIG. 4 shows a flow diagram of one method of the invention. The method begins in task 402, where a low activity communication signal is received by the telecommunications system. After the signal is received, vocoders used by the system during processing of the signal are locked into a full rate in task 404. In this embodiment, the transmission power may increase but does not decrease from a reference transmission power, that is, it does not decrease from the transmission power used by the telecommunications system for full rate transmissions in task 410. Typically, the vocoders will be locked at full rate and the transmission power will be increased for transmitting low activity signals.

Full rate refers the fact that each bit contained in each frame a signal represents a unique bit of information. Half-rate refers to sending the same number of bits per frame, however each bit appears is repeated once in the frame; that is, each unique bit of information will appear twice in a frame. Quarter-rate refers to each unique bit appearing four times per frame, and so on. The more repetitively a bit of information is sent, the less total information is sent per frame. At full rate the signal is sent at a higher power because a given bit is sent only once. This full rate power level is referred to as the reference power for purposes of this application. Because bits are repeated at lower rates, a reduced power level is used because the power for each repeated bit is accumulated over the frame.

The power level is typically set based upon a selected FER for the transmitted signal as received at a remote location, also referred to as the target of the transmitted signal, such as the subscriber unit. A desired FER is selected because when a low activity signal is being sent, the actual FER increases. This selected FER range is between a 0.1% and a 1.0% error rate, but may be greater or lesser if necessary for preservation of the quality of the transmitted signal. Preferably, an FER of 0.2% is desirable for low activity signals. If the FER exceeds the selected range in task 412, the remote location notifies the transmission station in convention fashion in task 406, such as base station 118 shown in FIG. 1, that a system adjustment to reduce the FER is needed and an adjustment is made in task 408. An adjustment will typically include increasing the transmission power for the full rate transmission, but may also include adjusting other parameters known to reduce FER. If the FER is acceptable in task 412, the signal transmission may continue in task 414 and dynamic adjustments to the telecommunications system continue throughout the transmission of the entire transmitted 410 signal. Otherwise, when the transmission of the low activity signal ends, the vocoders are unlocked, and the telecommunications system returns to normal operation. In other words, the desired FER increases to the previous level.

Setting the vocoders at a full rate for transmission of a low activity signal does not preclude other types of transmissions occurring over the telecommunications system. Voice signals and data signals may transmit at full rate, or the telecommunications system may switch back and forth between full rate transmission of low activity communications and transmissions at other rates and power levels.

Other Embodiments

While there have been shown what are presently considered to be preferred embodiments of the invention, it will be apparent to those skilled in the art that various changes and modifications can be made without departing from the scope of the invention as defined by the appended claims.

What is claimed is:

1. A method to determine the service used in a telecommunications system to transmit a low activity communication signal, comprising:

receiving said low activity communication signal;

locking all vocoders used in processing said low activity communication signal into a full rate;

encoding said low activity communication signal to create a digital signal;

adjusting the system if necessary to maintain a minimum target frame error rate for said low activity signal; and transmitting said digital signal.

2. The method recited in claim 1, further comprising:

noticing all vocoders used in encoding and decoding said low activity communication signal that said low activity communication signal was received; and wherein said locking of said vocoders occurs automatically as a result of said noticing, and wherein said minimum target frame error rate is between a 0.1% and a 1.0% error rate.

3. The method recited in claim 1 wherein said transmission is to a remote location connected within said telecommunications system by wireless link.

4. The method recited in claim 3, further comprising:

noticing all vocoders used in encoding and decoding said low activity communication signal that a low activity communication signal will be transmitted, and wherein said locking of all vocoders occurs automatically as a result of said noticing.

5. The method recited in claim 4, wherein noticing comprises sending a notice signal to said vocoders.

6. The method recited in claim 5, wherein said notice signal is not included in said low activity communication signal.

7. The method recited in claim 6, further comprising detecting a low rate telephone modem connected to said telecommunications system, wherein said noticing is caused by said detection.

8. The method recited in claim 6, further comprising:

receving said digital signal at said remote location; and decoding said digital signal to recreate a low activity communication signal, wherein said recreated low activity communication signal communicates same information as said digital signal when transmitted.

9. The method recited in claim 8, further comprising maintaining or increasing transmission power to maintain said minimum target frame error rate for said digital signal.

10. The method recited in claim 8, further comprising unlocking said vocoders from full rate.

11. The method recited in claim 9, further comprising noticing vocoders in said telecommunications system used to transmit said low activity communication signal that said low activity signal has ended, wherein said unlocking of said vocoders occurs automatically as a result of said noticing.

12. The method recited in claim 9, further comprising noticing vocoders in said telecommunications system used to transmit said low activity communication signal that an other rate communication signal has been received, wherein said unlocking of all vocoders occurs automatically as a result of said other rate noticing.

13. The method recited in claim 9, wherein said minimum target frame error rate is between 0.1% and 1.0%.

14. The method recited in claim 9, wherein said minimum target frame error rate is 0.2%.

15. A noticing apparatus used in a telecommunications system used to transmit a low activity communication signal, comprising:

a device port, said device port configured to receive a low activity communication device attachment, said port interfacing with said attachment to communicatively connect a low activity communication device to said telecommunications system; and a sensor integral to said device port, said sensor detecting that said low activity communication device has been connected to said telecommunications system, said detection causing said telecommunications system to be noticed that said low activity communication signal will be received, said noticing resulting in vocoders used to transmit said low activity communication signal being locked into a full rate.

16. The apparatus recited in claim 15, said device port further comprising:

at least one wall, said at least one wall forming an enclosure open at one end and surrounding a hollow interior;

communication connectors coupled to said at least one wall and extending into said hollow, wherein said connectors are configured to receive a low activity device attachment connected to said low activity communication device; and a communication link coupling said communication connectors to said telecommunications system, wherein said receipt of said low activity device attachment into said device port allows a communicative signal from said low activity communication device to be received by said telecommunications system.

17. The apparatus recited in claim 16, said sensor comprising a prong coupled to said at least one wall and extending into said hollow, wherein said prong is displaced when said low activity communication device attachment is received by said device port, said deflection causing noticing of said telecommunications system that said low activity communication signal will be received.

18. The apparatus recited in claim 16, wherein said sensor comprises a digital device configured to sense when said low activity communication signal is received by said communication connectors.

19. A noticing apparatus used in a telecommunications system for transmitting a low activity communication, comprising:

a port means for interfacing with a low activity communication device attachment to communicatively connect a low activity communication device to said telecommunications system, said port means configured to receive said low activity communication device attachment; and a sensor means coupled to said port means for detecting when a low activity communication device has been communicatively connected to said telecommunications system and for causing said telecommunications system to be noticed that said low activity communication will be received, wherein said notice to said telecommunications system causes any vocoder involved in transmitting said low activity communication to automatically lock into a full rate, and wherein said telecommunications system adjusts as necessary to minimize any target frame error rate experienced during transmission.

20. The apparatus recited in claim 19, wherein said target frame error rate is between a 0.1% and a 1.0% error rate.

21. The apparatus recited in claim 19, wherein said target frame error rate is 0.2%.

* * * * *